3,124,558
PRESSURE-SENSITIVE ADHESIVE TAPE
Nova E. Stucker, St. Paul, and Waldo Kellgren, Birchwood, Minn., assignors to Minnesota Mining and Manufacturing Company, St. Paul, Minn., a corporation of Delaware
No Drawing. Filed Jan. 26, 1962, Ser. No. 169,139
1 Claim. (Cl. 206—59)

This invention relates to a normally tacky, pressure-sensitive adhesive-coated paper-backed protective tape. This invention further relates to a paper-backed protective tape using a novel thin, stretchable, but inelastic pigmented polymeric film backsize coating on a highly-stretchable beater-treated crepe paper element in the backing. Still another aspect of this invention is the use of such a tape as a protective covering for the white sidewall portion of pneumatic rubber tires during the transportation and prolonged storage thereof.

A major problem associated with transportation and storage of white sidewall pneumatic rubber tires is the protection of the white sidewall portion thereof from abrasion or other defacement and from discoloration by migratory, stain-producing processing materials present in adjacent tires when contacted thereagainst. The latter is particularly true when black and white sidewall tires are mixed during shipment or storage. A common practice has been to apply a complete wrapping of kraft paper to the tire as a protective means. While somewhat satisfactory this type of wrapping does not afford sufficient protection for the white sidewall portion of the tires particularly when in contact with unwrapped blackwall tires. In addition, such paper wrappings are not sufficiently water resistant to permit long term outdoor storage, the wrapping often coming loose and taking on an unsightly appearance. Annother practice is to apply to the white sidewalls of tires a water-removable oleophobic protective coating. This coating is removed by simple washing with water when the tire is placed in service. While providing some degree of protection, these coatings are by their nature subject to the destructive action of abrasion, sunlight and water (rain, snow, etc.); the latter action taking place when the tires are stored out of doors. Also, these coatings are not sufficiently resistant to the scuffing or abrading action of adjacent tires during shipment. At the present time the preferred water-removable coating material for white sidewall tire protection is an aqueous solution of plasticized polyvinyl alcohol (such as that available commercially from the Spraylat Corporation, New York, New York, and identified as "PM5882," a water solution containing polyvinyl alcohol weighing 8.75 pounds per gallon, containing 19 to 21% solids).

We have now devised a suitable normally tacky, pressure-sensitive paper-backed protective tape article which, when adhered to the white sidewall portion of pneumatic tires, which has previously been coated with a water-removable oleophobic protective coating of polyvinyl alcohol or the like, affords complete protection against soiling and abrasion even under adverse shipment and storage conditions previously mentioned.

The tape can be readily and mechanically applied directly over the water-removable coating mentioned above. The coating affords a release surface permitting of easy tape removal when the tire is to be mounted. In the absence of such a coating thhe tape would develop such a strong bond to the rubber tire surface as to prevent easy stripping off of the tape. After removal of the tape, the coating can be readily washed off, thereby exposing the clean unmarred white sidewall surface.

Our novel tape has other uses. In many instances it will perform satisfactorily for general use as a replacement for more expensive conventional tapes not requiring performance features peculiar to the latter and with the advantage for some usages of greater stretchiness.

Our novel tape employs a unified, highly-stretchable and conformable creped paper backing which is coated on one side with any suitable aggressively tacky rubbery-base pressure-sensitive adhesive such as those used in the manufacture of masking tapes. The nonadhesive back side of the paper carries a suitable backsize coating that provides not only a continuous film when the tape is stretched during application and is impervious to migratory tire stock processing materials, but also affords long-lasting protection from abrasion from adjacent tires when transported and stored thereagainst and the degrading effects of water and sunlight when the tires are stored out of doors.

The highly-stretchable and conformable crepe paper backing is prepared from highly-beaten, semi-glassine stock, preferably using unbleached or semi-bleached kraft pulp; the fibers having been beaten to a Williams freeness value of about 100 to 500 seconds. Fiber sizing agents (synthetic or natural) may be incorporated in the beater stock, the sizing agent being water-insoluble in the paper product; deposition of the sizing solids thus occurring prior to the formation of the wet paper in the paper making machine. Examples of suitable sizing agents are neoprene (rubbery polymer of 2-chloro-1,3-butadiene), Buna-N and Buna-S rubbers, wet-strength resins of the urea-formaldehyde, melamine-formaldehyde and polyester types, sodium silicate and viscose, with neoprene being preferred. Such beater sizing agents should be employed in an amount only so as to provide a paper backing containing no more than 25% of additives relative to paper fiber weight on a dry solids basis. The initial presence of the latex sizing in the structure of the wet paper imparts a higher wet strength, and it permits of fine retained creping to obtain a high stretch that is not lost in the subsequent drying operation on the paper making machine. Adequate unification of paper fibers is not wholly dependent upon the incorporation of such sizing agents. The highly-beaten semi-glassine fiber stock employed in making the paper contains fibers whose fibrillation and gelation results in direct fiber-to-fiber bonds in the paper product that produce adequate unification of the structure even in the absence of any fiber-binding or fiber-sizing agent. When limited use is made of beater sizing agents as indicated above, there is no substantial reduction in the number of direct fiber-to-fiber bonds.

During the paper-making operation the freshly formed paper is given a high degree of creping while still in a wet or damp condition, prior to complete drying on the heated cylinders. This is termed "wet-creped" paper and distinguishes from papers that have been creped after original drying and setting of the fiber structure. Crepe lines are provided in the range of about 20 to 60 per lineal inch. This is of critical importance as excessively coarse or fine creping will not permit of a tape product having the requisite combination of properties.

The creped paper has a high stress-strain modulus which permits of manufacturing the tape, and of unwinding the tape from a roll, without impairment or pulling out of the creping, despite the fact that the paper and the tape have high ultimate stretch values of at least 25%.

A critical element of our novel protective tape is the very thin, inelastic but highly stretchable, water-and-oil-resistant pigmented polymeric film backsize coating bonded to the "dull" back side of the creped paper (the "dull" side of creped paper is the side that does not carry the sharp crepe lines or ridges). This backsize film serves as a barrier film to provide the tape product with adequate resistance to sunlight and to weather and water degradation, and resistance to the aforementioned stain-producing migratory processing materials. This backsize film must also be possessed of sufficient stretchiness so as not to be fractured when the tape is applied to the tire in a highly stretched condition. A film-forming polymer of vinylidene chloride in latex form, is well-suited for this use. Colored pigments or dyes may be incorporated into the backsizing composition should distinctive appearance be required. This backsized creped paper element is then calendered. Calendering is highly advantageous in rendering the sheet thinner, denser, smoother, more pliant, more uniform and in reducing the coating weight of adhesive that is needed to obtain the requisite adhesive bonding strength. A typical calendering operation reduces the caliper from 12–14 mils to about 9–11 mils. Calendering the paper prior to backsizing may be carried out with equivalent caliper reduction.

To complete our novel protective tape structure a pressure-sensitive adhesive composition is coated upon the face ("sharp") side of the backing and penetrates the porous paper structure to secure a strong anchorage, no primer being required, resulting after drying in a firmly bonded adhesive coating. The combination of high creping and polymeric film backsize coating permits of a tape that even in wide rolls can be unwound without the need for low adhesion coatings commonly used in the manufacture of rolls of pressure-sensitive tapes.

In order that our protective tape be applicable to the various widths of white sidewalls in common use, it is highly important that it have the proper degree of stretch. The following table shows the approximate degree of usable stretch required for our tape when applied to presently used white sidewalls for three conventional wheel diameters. In each case the applied tape has a width approximately equal to the width of the sidewall portion of the tire and must be stretchy enough so that the edges will conform to the inner and outer circumferences of the sidewall, and so that complete surface contact is made, as the strip of tape is applied upon and along the sidewall to cover it.

| Sidewall Width, inches | 14″ wheel, percent | Usable Stretch [1] 15″ wheel, percent | 16″ wheel, percent |
|---|---|---|---|
| 3 | 41 | 38 | 36 |
| 2½ | 34 | 32 | 30 |
| 2 | 27 | 25 | 24 |
| 1¾ | 24 | 22 | 20 |
| 1½ | 20.5 | 19 | 18 |
| 1 | 14 | 12.5 | 12 |

[1] Usable Stretch is defined as the stretch available to the tape applicator for proper application of the tape to the tire sidewall. It is approximately 10% less than the ultimate stretch possessed by the tape as measured when the tape is stretched to its breaking point.

The tape should have a "dead stretch," and a stretch value (measured on a 1″ width of tape when hand pulled to the breaking point) of at least 25% and preferably at least 35% to permit of use on a variety of tires. This permits of such a high degree of usable stretch that the tape can be readily applied to the sidewall of a tire. The unitary tape combination of paper backing, backsize coating and pressure-sensitive adhesive has a "dead stretch" (as distinguished from a "live-stretch" such as that of rubber bands) and this prevents the tape from retracting and thereby coming detached from the sidewall surface.

*Example 1*

This example describes in some detail the making of a presently preferred embodiment of our protective tape but the invention is not limited thereto and embraces equivalent constructions.

Commercial scale paper mill equipment is employed comprising in connected series a beater, a storage chest, a cylinder type paper machine having an endless wet press felt which picks up the wet fiber layer from the cylinder screen and transfers it to a steel wet press roll. This wet press felt is a very fine wool felt adapted to impart only a slight and fine mark to the wet paper web, thereby permitting of fine creping on the wet press roll by means of a suitable thin steel creping blade (e.g., a blade having a thickness of 10 to 30 mils) adapted to impart a fine crepe. An endless woven cotton belt transfers the wet creped web into a dryer section of the machine where the paper is dried by passing around a series of heated steel cylinders. The dried creped paper then passes through an air-knife coater where the pigmented latex backsize composition is applied to the dull side of the paper. The coated paper is dried by passage through a further dryer section after which it is calendered. The dried backsized and calendered web is then wound into large stock rolls.

The web is then passed through a knife-coater for application of pressure-sensitive adhesive solution to the sharp side and is dried by passage through a hot air drying oven to remove the solvent. The dried adhesive-coated web is wound into large rolls, which are sent to the slitter where the web is slit into tapes of desired width and wound into rolls of tape of desired length.

An illustrative preferred procedure for manufacturing the tape backing in the above-described manner will now be given:

The beater is charged with 600 lbs. of unbleached kraft wood pulp and sufficient water to provide a 3% (by weight) consistency. The pulp is subjected to hard and prolonged beating that results in a semi-glassine stock having a Williams freeness value of 125 seconds. The beater roll is then raised away from the bed plate to permit of mixing without further beating. The pulp slurry is diluted with water to 2% consistency and the following mixture is added and thoroughly mixed with the stock:

|  | Pounds |
|---|---|
| Water | 25.0 |
| Soda ash | 3.0 |
| Zinc oxide | 18.0 |
| Antioxidant (e.g., 2,2′-methylene - bis(4 - methyl,6-tert-butyl phenol), such as "Antioxidant 2246," made by American Cyanamid Co.) | 2.4 |
| Dispersing and stabilizing agent (e.g., a sodium salt of a condensed aryl sulfonic acid, such as "Tamol N," made by Rohm & Haas Co.) | 2.4 |

The resultant beater stock has a pH value of about 9. Then 316 pounds of aqueous latex dispersion containing 120 pounds of latex solids is added and thoroughly mixed with the pulp. A polychloroprene latex (such as "neoprene" type 735, made by E. I. du Pont de Nemours & Co.) is used, although equivalent rubber polymer latices may be employed. A 25% aqueous solution containing 100 pounds of alum is slowly added with gentle mixing to precipitate the rubbery latex and zinc oxide particles on the pulp fibers, the pH value being about 4.5. The precipitation coats the fibers with a mixture of zinc oxide and colloidal rubber particles, although some coagulation occurs to form finely divided flocs held by the fibers. The sized fibers hold the precipitated solids sufficiently well so that a clear white water is obtained at the paper machine, substantially all of the solids being carried into the paper. The zinc oxide is employed to cure the polychloroprene and to neutralize any acid liberated by it during storage.

The moist paper containing the sizing solids is given a fine creping resulting in an average of about 45 crepe lines per lineal inch. The resultant paper has a ream weight of 45 pounds (weight of 333⅓ square yards), corresponding to 135 pounds per thousand square yards, a lengthwise tensile strength of 6 pounds per inch width, and a lengthwise stretch of 60% when pulled to rupture.

The pigmented backsize coating composition is prepared by first making a slurry of 37 parts of rubber-compounding type of clay (for example a hard purified Georgia clay such as "Aiken" or "Dixie" clay) and 74 parts of titanium oxide pigment using a dispersing agent (for example 1% of tetrasodium phosphate). The slurry is mixed with 195 parts of vinylidene chloride polymer latex (such as that sold under the trade name "Daran" 202 by Dewey and Almy Chemical Company, containing 60–62% solids). The ratio of clay and titanium dioxide solids to vinylidene chloride polymer latex solids is approximately 1:1. This aqueous coating mixture is applied to the dull side of the creped paper element in a coating weight that provides a very thin dried film of uniform thickness and weighing about 54 pounds per thousand square yards. The dried backsized web has a caliper thickness of about 12 mils which is reduced to 9 mils by calendering. The backsize film is so thin that it does not appreciably change the caliper thickness of the creped paper.

The pressure-sensitive adhesive-coated finished tape product has a total caliper of thickness of 12 mils, a tensile strength of 9 pounds per inch of width and a stretch of 44% when hand pulled.

*Example II*

The beater was charged with 1500 pounds of kraft pulp (for instance, "Dryden Easy-Bleaching Pulp," sold by the Dryden Paper Co. Ltd., Ontario, Canada), and 3400 gallons of water. The beater roll was set down on the bed plate to produce hard beating which was prolonged for about 3½ hours to produce a Williams freeness value of about 100 seconds. The beater roll was then raised and sufficient additional water was mixed in to dilute the paper-making stock to a 3.2% consistency (3.2% fiber solids by weight). 3½ pounds of soda ash was then added to raise the pH to about 8.6. 237 pounds of wet-strength resin additive (such as "Uformite" #700 resin, a nitrogenous resin in aqueous solution containing 30% resin solids, sold by Rohm & Haas Co.) was then added to the beater. After the wet-strength resin was thoroughly dispersed, 140 pounds of aluminum sulfate was added to "set" the wet-strength resin onto the paper fibers.

The moist paper was then creped resulting in an average of abotu 25 crepe lines per lineal inch. The creped paper after drying weighed about 120 pounds per thousand square yards, had a lengthwise tensile strength of 10 pounds per inch width, a lengthwise stretch of about 49% and a caliper of about 12–13 mils.

The dried creped paper was then, as described in the previous example, backsized after which it was calendered to reduce the caliper to about 10 mils. The backsized, calendered web was then coated with adhesive as in the previous example.

We claim:

A pressure-sensitive adhesive protective tape wound upon itself in roll form consisting of a semi-glassine wet-creped paper backing made from highly-beaten paper fibers and devoid of other components weighing more than 25% of the fiber weight, said paper weighing 120 to 180 pounds per thousand square yards and having 20 to 60 crepe lines per lineal inch, said backing being coated on the dull side with a very thin, highly stretchable but inelastic, water-and-oil-resistant pigmented polymeric barrier film backsizing and on the sharp side with an aggressively tacky pressure-sensitive adhesive; such that the adhesive tape has a dead stretch and a stretch value of at least 25%, a tensile strength of at least 6 pounds per inch width, and can be readily unwound from the roll without impairment and removed from surfaces to which temporarily applied.

References Cited in the file of this patent

UNITED STATES PATENTS 2,954,868    Swedish et al. _____ Oct. 4, 1960